(12) United States Patent
Mizushima

(10) Patent No.: US 12,523,252 B2
(45) Date of Patent: Jan. 13, 2026

(54) BEARING DEVICE FOR A VEHICLE WHEEL

(71) Applicant: NTN Corporation, Osaka (JP)

(72) Inventor: Shouta Mizushima, Shizuoka (JP)

(73) Assignee: NTN CORPORATION, Osaka (JP)

( * ) Notice: Subject to any disclaimer, the term of this patent is extended or adjusted under 35 U.S.C. 154(b) by 45 days.

(21) Appl. No.: 18/569,371

(22) PCT Filed: Jun. 7, 2022

(86) PCT No.: PCT/JP2022/022946
§ 371 (c)(1),
(2) Date: Dec. 12, 2023

(87) PCT Pub. No.: WO2022/264880
PCT Pub. Date: Dec. 22, 2022

(65) Prior Publication Data
US 2024/0270017 A1   Aug. 15, 2024

(30) Foreign Application Priority Data

Jun. 14, 2021   (JP) ................................ 2021-098729

(51) Int. Cl.
*F16C 19/18*   (2006.01)
*B60B 27/00*   (2006.01)
(Continued)

(52) U.S. Cl.
CPC ........ *F16C 19/186* (2013.01); *B60B 27/0005* (2013.01); *B60B 27/0073* (2013.01);
(Continued)

(58) Field of Classification Search
CPC ............ B60B 27/0005; B60B 27/0073; B60B 27/0084; B60B 27/0094; B60B 2380/12;
(Continued)

(56) References Cited

U.S. PATENT DOCUMENTS

| 8,979,385 B2 * | 3/2015 | Haepp ................. F16C 33/7886 |
| | | 384/488 |
| 9,689,431 B2 * | 6/2017 | Walter ................ F16C 33/7879 |
| 2019/0113080 A1 | 4/2019 | Kamiya et al. |

FOREIGN PATENT DOCUMENTS

| EP | 3299649 A1 * | 3/2018 | ............ F16C 33/782 |
| JP | 2010-180896 | 8/2010 | |

(Continued)

OTHER PUBLICATIONS

JP2013061048A_Description.*

(Continued)

*Primary Examiner* — Phillip A Johnson
(74) *Attorney, Agent, or Firm* — Wenderoth, Lind & Ponack, L.L.P.

(57) ABSTRACT

A wheel bearing device for which the work of grinding a wheel hub is simplified. The wheel hub (3) has an inside track groove (3*c*), a seal land part (3*d*), a recess (3*m*), and a flange surface (3*k*). An outer-side sealing member (10) is provided with a core metal (11) and a sealing member (12). The sealing member includes a contact lip (12*d*) and a labyrinth lip (12*e*) facing the recess across a gap. The recess has a bottom (313) located between an outer diameter-side edge (311) and an inner diameter-side edge (312), and a tapered surface (314) that extends in the radial direction from the outer diameter-side edge toward the bottom and tilts toward one end of the axial direction going from the outer diameter-side edge toward the bottom.

6 Claims, 6 Drawing Sheets

(51) Int. Cl.
*F16C 33/78* (2006.01)
*F16C 33/80* (2006.01)

(52) U.S. Cl.
CPC ...... *B60B 27/0084* (2013.01); *B60B 27/0094* (2013.01); *F16C 33/7876* (2013.01); *F16C 33/805* (2013.01); *B60B 2380/12* (2013.01); *F16C 2326/02* (2013.01)

(58) Field of Classification Search
CPC .... F16C 19/186; F16C 33/7876; F16C 33/80; F16C 33/805; F16C 2326/02
See application file for complete search history.

(56) References Cited

FOREIGN PATENT DOCUMENTS

| | | | | |
|---|---|---|---|---|
| JP | 2011089558 A | * | 5/2011 | ............ F16C 33/782 |
| JP | 2013-61048 | | 4/2013 | |
| JP | 2013-72553 | | 4/2013 | |
| JP | 2013061048 A | * | 4/2013 | .......... F16C 33/7876 |
| JP | 2015183801 A | * | 10/2015 | |

OTHER PUBLICATIONS

JP2015183801A.*
International Search Report issued Aug. 16, 2022 in International Application No. PCT/JP2022/022946.

* cited by examiner

BEARING DEVICE FOR A VEHICLE WHEEL

TECHNICAL FIELD

The present invention relates to a bearing device for vehicle wheel.

BACKGROUND ART

Conventionally, a bearing device for vehicle wheel rotatably supporting a vehicle wheel in a suspension device of an automobile or the like is known. The bearing device for vehicle wheel is provided with a sealing device that closes an opening end of an annular space formed by an outer member and an inner member to prevent entry of foreign matters such as muddy water.

For example, in the bearing device for vehicle wheel described in Patent Literature 1, a hub ring, which is an inner member, has a hub flange extending radially outward, a sliding face on which a main lip of a sealing device is in sliding contact is formed at a base end portion of the hub flange, and a recess portion is formed on an outer diameter side relative to the sliding face of the hub flange. A side lip of the sealing device contactlessly faces the recess portion of the hub flange, and a labyrinth seal is formed by the recess portion and the side lip, thereby improving mud water resistance of the sealing device.

In this case, a flange face and the recess portion positioned on the outer diameter side relative to the recess portion in the hub flange are formed by turning, and the sliding face is formed by grinding.

CITATIONS LIST

Patent Literature

Patent Literature 1: JP-A 2013-61048 Gazette

SUMMARY OF INVENTION

Technical Problems

However, since the recess portion has a U-shape and an outer diameter side edge portion of the recess portion is formed on a face perpendicular to the radial direction, when the hub flange is ground from the outer diameter side toward the inner diameter side, a turning tool for turning the flange face is less likely to enter an outer peripheral side portion of the recess portion from the outer diameter side.

Therefore, when turning the hub flange, it is necessary to, after turning the flange face on the outer diameter side relative to the recess portion, perform turning of the recess portion with a turning tool replaced with a tool suitable for turning the outer peripheral side edge portion of the recess portion, and the grinding work of the hub ring is complicated.

The present invention has been made in view of the above circumstances, and it is an object of the present invention to provide a bearing device for vehicle wheel that, when performing turning on a hub flange, can continuously perform turning on a recess portion without replacing a turning tool after performing turning on an outer diameter side relative to the recess portion, and can simplify grinding work on a hub ring.

Solutions to Problems

That is, a bearing device for vehicle wheel includes: an outer member having a double row outer raceway grooves on an inner periphery; an inner member including a hub ring having a hub flange extending radially outward at an axial one end portion and having a small diameter step portion extending axially on an outer periphery, and at least one inner ring press-fitted into the small diameter step portion of the hub ring, the inner member having a double row inner raceway grooves facing the double row outer raceway grooves; a double row rolling elements rollably accommodated between both raceway grooves of the outer member and the inner member; and a sealing device closing an opening end on an axial one end side of an annular space formed by the outer member and the inner member, in which the hub ring includes the inner raceway groove, a seal land portion positioned at a base end portion of the hub flange and the seal land portion with which the sealing device is in sliding contact, a recess portion positioned on an outer diameter side of the seal land portion in the hub flange, and a flange face positioned on an outer diameter side of the recess portion in the hub flange, the sealing device includes a core metal fitted to an axial one end portion of the outer member, and a seal member integrally joined to the core metal, the seal member includes a contact lip extending from the core metal toward the hub flange side and coming into contact with the seal land portion, and a labyrinth lip extending from the core metal toward the hub flange side on an outer diameter side relative to the contact lip and axially faces the recess portion across a gap, and the recess portion includes a bottom portion positioned between an outer diameter side edge portion and an inner diameter side edge portion of the recess portion, the bottom portion where a depth of the recess portion is largest, and a tapered face radially extending from the outer diameter side edge portion toward the bottom portion side and inclined toward an axial one end side from the outer diameter side edge portion toward the bottom portion.

Advantageous Effects of Invention

According to the present invention, grinding work of a hub ring can be simplified.

DESCRIPTION OF EMBODIMENT

Hereinafter, an embodiment for carrying out the present invention will be described with reference to the accompanying drawings.

[Bearing Device for Vehicle Wheel]

Figure 1:
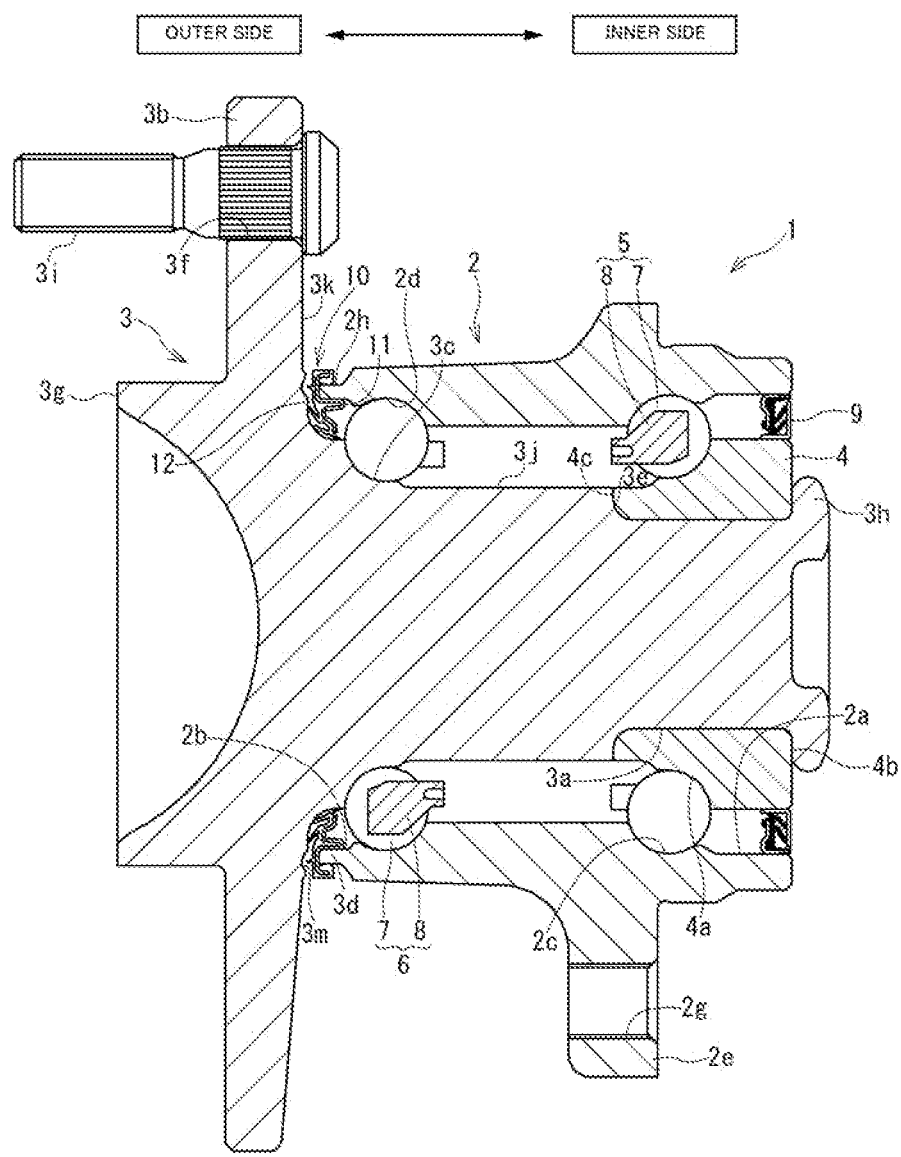
FIG. 1 is a side cross-sectional view illustrating a bearing device for vehicle wheel.

A bearing device for a vehicle wheel 1 illustrated in FIG. 1 is an embodiment of a bearing device for vehicle wheel according to the present invention, and rotatably supports a vehicle wheel in a suspension device of a vehicle such as an automobile.

The bearing device for a vehicle wheel 1 has a configuration called a third generation, and includes an outer ring 2, which is an outer member, a hub ring 3 and an inner ring 4, which are inner members, two rows of an inner side ball rows 5 and an outer side ball row 6, which are rolling rows, and an inner side seal member 9 and an outer side seal member 10.

Here, the inner side represents the vehicle body side of the bearing device for a vehicle wheel 1 when mounted to the vehicle body, and the outer side represents the vehicle wheel side of the bearing device for a vehicle wheel 1 when mounted to the vehicle body. The axial represents a direction along a rotation axis of the bearing device for a vehicle wheel 1, and the axial one end side is the outer side and the axial other end side is the inner side.

An inner side opening portion 2*a* into which the inner side seal member 9 can be fitted is formed at an inner side end portion of the outer ring 2. An outer side opening portion 2*b* into which the outer side seal member 10 can be fitted is formed at an outer side end portion of the outer ring 2. An outer raceway groove 2*c* on the inner side and an outer raceway groove 2*d* on the outer side are formed on an inner peripheral face of the outer ring 2.

A vehicle body mounting flange 2*e* for mounting the outer ring 2 to a vehicle body side member is integrally formed on an outer peripheral face of the outer ring 2. The vehicle body mounting flange 2*e* is provided with a bolt hole 2*g* into which a fastening member (here, the bolt) for fastening the vehicle body side member and the outer ring 2 is inserted.

A small diameter step portion 3*a* having a smaller diameter than the outer side end portion is formed at an inner side end portion of an outer peripheral face 3*j* of the hub ring 3. A shoulder portion 3*e* is formed at an outer side end portion of the small diameter step portion 3*a* of the hub ring 3. A vehicle wheel mounting flange 3*b* for mounting a vehicle wheel is integrally formed at an outer side end portion of the hub ring 3. A plurality of bolt holes 3*f* are formed in the vehicle wheel mounting flange 3*b*. A hub bolt 3*i* for fastening the hub ring 3 and the vehicle wheel or a brake component is press-fitted into the bolt hole 3*f*. The vehicle wheel mounting flange 3*b* is an example of the hub flange extending radially outward.

The outer peripheral face 3*j* of the hub ring 3 is provided with an inner raceway groove 3*c* on the outer side so as to face the outer raceway groove 2*d* on the outer side of the outer ring 2. That is, on the outer side of the inner member, the inner raceway groove 3*c* is configured by the hub ring 3. The outer side seal member 10 is fitted to an outer side opening end of an annular space formed by the outer ring 2 and the hub ring 3, and closes the outer side opening end. The outer side seal member 10 is an example of the sealing device.

A seal land portion 3*d* with which the outer side seal member 10 comes into sliding contact is formed at a base end portion on the inner side of the vehicle wheel mounting flange 3*b*. The inner raceway groove 3*c* is axially positioned adjacent to the inner side of the seal land portion 3*d*. The vehicle wheel mounting flange 3*b* includes a flange face 3*k* facing the inner side. The flange face 3*k* is positioned on the outer diameter side of the seal land portion 3*d*.

A recess portion 3*m* is formed between the flange face 3*k* and the seal land portion 3*d* on a side face om the inner side of the vehicle wheel mounting flange 3*b*. The recess portion 3*m* is formed in a groove shape recessed from the side face on the inner side to the outer side of the vehicle wheel mounting flange 3*b*. The hub ring 3 includes an outer side end face 3*g* at an end portion on the outer side of the vehicle wheel mounting flange 3*b*.

The small diameter step portion 3*a* of the hub ring 3 is provided with the inner ring 4. The inner ring 4 is fixed to the small diameter step portion 3*a* of the hub ring 3 by press fitting and crimping. The inner ring 4 applies preload to the inner side ball row 5 and the outer side ball row 6, which are rolling rows. The inner ring 4 includes an inner side end face 4*b* at the inner side end portion, and an outer side end face 4*c* at the outer side end portion. A crimped portion 3*h* crimped to the inner side end face 4*b* of the inner ring 4 is formed at an inner side end portion of the hub ring 3.

The outer peripheral face of the inner ring 4 is provided with an inner raceway groove 4*a* on the inner side so as to face the outer raceway groove 2*c* on the inner side of the outer ring 2. That is, the inner raceway groove 4*a* is formed by the inner ring 4 on the inner side of the inner member.

The inner side ball row 5 and the outer side ball row 6, which are rolling rows, are configured by holding a plurality of balls 7, which are rolling elements, by a cage 8. The inner side ball row 5 is rollably sandwiched between the inner raceway groove 4*a* of the inner ring 4 and the outer raceway groove 2*c* on the inner side of the outer ring 2. The outer side ball row 6 is rollably sandwiched between the inner raceway groove 3*c* of the hub ring 3 and the outer raceway groove 2*d* on the outer side of the outer ring 2. That is, the inner side ball row 5 and the outer side ball row 6 are rollably accommodated between the both raceway grooves of the outer member and the inner member.

In the bearing device for a vehicle wheel 1, the outer ring 2, the hub ring 3, the inner ring 4, the inner side ball row 5, and the outer side ball row 6 constitute a double row angular ball bearing. The bearing device for a vehicle wheel 1 may constitute a double row tapered roller bearing instead of the double row angular ball bearing.

[Outer Side Seal Member]

Figure 2:
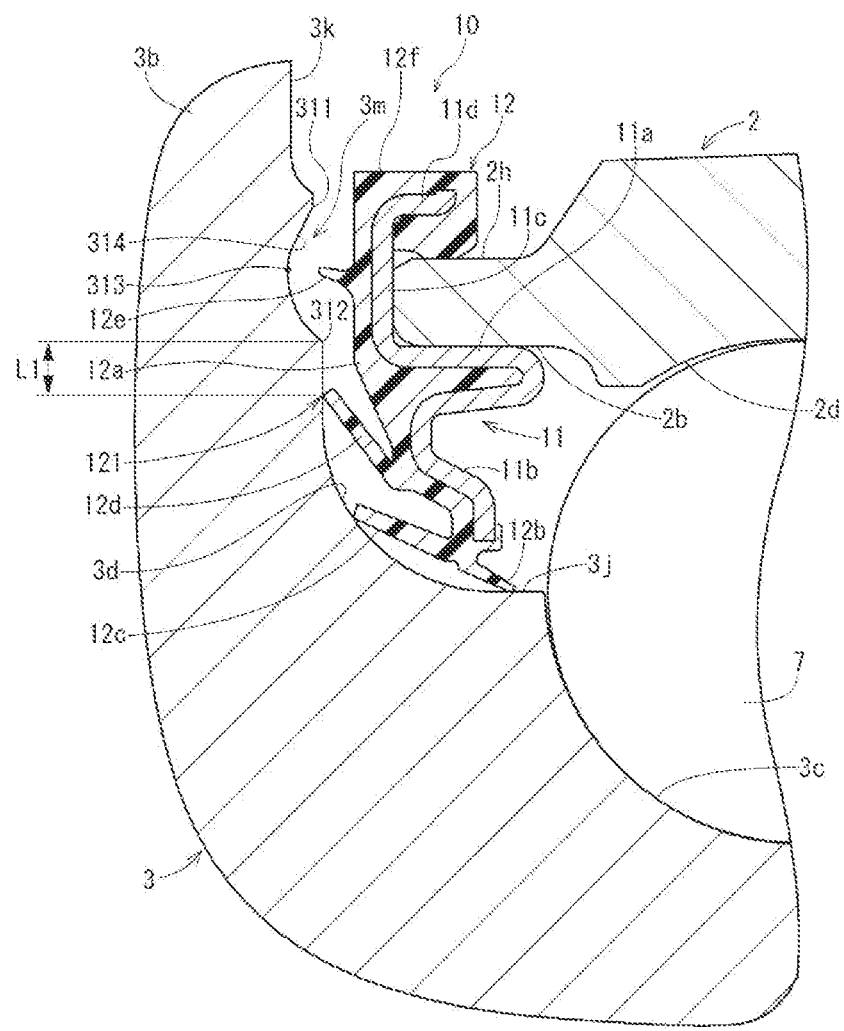
FIG. 2 is a side cross-sectional view illustrating a base end portion of a vehicle wheel mounting flange in an outer side seal member and a hub ring.

As illustrated in FIG. 2, the outer side seal member 10 includes a core metal 11 fitted to the inner periphery of the outer side end portion in the outer ring 2, and a seal member 12 integrally joined to the core metal 11.

The core metal 11 is made of, for example, a steel plate, and includes a fitting portion 11*a* having a cylindrical shape fitted to the inner periphery of the outer side opening portion 2*b* of the outer ring 2, an inner portion 11*b* extending from the inner side end portion of the fitting portion 11*a* to the inner diameter side, an outer portion 11*c* extending from the outer side end portion of the fitting portion 11*a* to the outer diameter side, and an outer edge portion 11*d* extending from the outer diameter side end portion of the outer portion 11*c* to the inner side.

The inner portion 11*b* is bent from the inner side end portion of the fitting portion 11*a*, extends to the outer side, then extends to the inner diameter side, further extends to the inner side and the inner diameter side, and then extends to the inner diameter side. The outer edge portion 11*d* extends to the inner side at a predetermined interval from the outer peripheral face 2*h* of the outer ring 2.

The seal member 12 is made of, for example, an elastic member such as synthetic rubber, and is joined to the core metal 11 by vulcanization adhesion. The seal member 12 includes a base portion 12*a*, a radial lip 12*b*, a first contact lip 12c, a second contact lip 12d, a labyrinth lip 12e, and a weir portion 12f. The base portion 12a is joined in a range from the inner portion 11b of the core metal 11 to the outer edge portion 11d via the fitting portion 11a and the outer portion 11c.

The radial lip 12b is positioned at the inner diameter side end portion of the seal member 12, and extends radially inward and toward the inner side from the inner portion 11b of the core metal 11. The radial lip 12b is in sliding contact with the outer peripheral face 3j of the hub ring 3 via an oil film of grease.

The first contact lip 12c extends from the inner portion 11b of the core metal 11 toward the vehicle wheel mounting flange 3b side and radially outward on the outer diameter side relative to the radial lip 12b. The first contact lip 12c is in sliding contact with the seal land portion 3d via an oil film of grease. The first contact lip 12c is an example of the contact lip that comes into contact with the seal land portion 3d.

The second contact lip 12d extends from the inner portion 11b of the core metal 11 toward the vehicle wheel mounting flange 3b side and radially outward on the outer diameter side relative to the first contact lip 12c. The second contact lip 12d is in sliding contact with the seal land portion 3d via an oil film of grease. The second contact lip 12d includes, on a tip end side, a contact portion 121 in sliding contact with the seal land portion 3d. The second contact lip 12d is an example of the contact lip that comes into contact with the seal land portion 3d.

In the present embodiment, the seal member 12 in the outer side seal member 10 includes the first contact lip 12c and the second contact lip 12d, and includes the plurality of contact lips. However, the seal member 12 may have a configuration including one contact lip or a configuration including three or more contact lips. Thus, by configuring the seal member 12 to include one contact lip or two or more contact lips, it is possible to increase a range of specifications of the seal member 12 applicable to the bearing device for a vehicle wheel 1, and it is possible to improve versatility.

The labyrinth lip 12e extends from the outer portion 11c of the core metal 11 toward the vehicle wheel mounting flange 3b side on an outer diameter side relative to the second contact lip 12d. The labyrinth lip 12e axially faces the recess portion 3m of the vehicle wheel mounting flange 3b across a gap. The labyrinth lip 12e is an example of the labyrinth lip axially facing a recess portion across a gap.

The labyrinth lip 12e of the seal member 12 and the recess portion 3m of the vehicle wheel mounting flange 3b constitute a labyrinth seal. The labyrinth lip 12e and the recess portion 3m constitute the labyrinth seal, thereby suppressing foreign matters such as muddy water from entering the outer side seal member 10.

The weir portion 12f covers the outer edge portion 11d of the core metal 11, protrudes radially outward relative to the outer peripheral face 2h of the outer ring 2, and is in contact with the outer peripheral face 2h of the outer ring 2.

[Hub Ring]

As illustrated in FIG. 2, in the vehicle wheel mounting flange 3b of the hub ring 3, the flange face 3k, the recess portion 3m, and the seal land portion 3d are positioned in this order from the outer diameter side toward the base end portion side. That is, in the vehicle wheel mounting flange 3b, the recess portion 3m is positioned on the outer diameter side of the seal land portion 3d, and the flange face 3k is positioned on the outer diameter side of the recess portion 3m. The inner raceway groove 3c is positioned on the inner side and the inner diameter side of the seal land portion 3d.

In the hub ring 3, the flange face 3k, the recess portion 3m, the seal land portion 3d, and the inner raceway groove 3c are subjected to turning by a turning tool, and the seal land portion 3d and the inner raceway groove 3c are further subjected to grinding by a grinding wheel after the turning.

When turning is performed on the hub ring 3, the flange face 3k is processed from the outer diameter side toward the inner diameter side, then the recess portion 3m is processed, and the seal land portion 3d and the inner raceway groove 3c are processed in order. When grinding is performed on the hub ring 3, grinding is simultaneously performed on the seal land portion 3d and the inner raceway groove 3c using a grinding wheel.

In the hub ring 3, since turning and grinding are performed in this manner, the flange face 3k and the recess portion 3m have turning faces, and the seal land portion 3d and the inner raceway groove 3c have grinding faces. Note that for example, the recess portion 3m of the hub ring 3 can be subjected to post-processing such as shot blasting after turning. When the recess portion 3m is subjected to shot blasting, the recess portion 3m has a blasted face.

Figure 3:
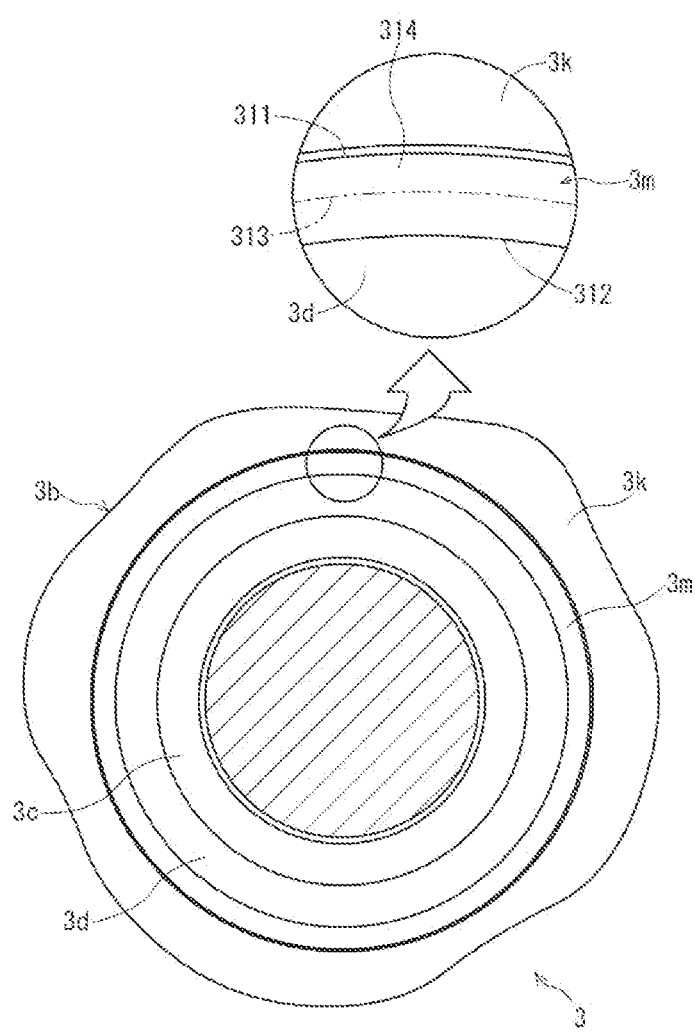
FIG. 3 is a partial cross-sectional view of the hub ring as viewed from the inner side axially.

As illustrated in FIGS. 2 and 3, the recess portion 3m is formed in an annular groove shape extending along the circumferential direction, and includes an outer diameter side edge portion 311, which serves as a boundary portion between the flange face 3k and the recess portion 3m, an inner diameter side edge portion 312, which serves as a boundary portion between the recess portion 3m and the seal land portion 3d, and a bottom portion 313, which is radially positioned between the outer diameter side edge portion 311 and the inner diameter side edge portion 312 and has the largest axial depth of the recess portion 3m.

The inner diameter side edge portion 312 of the recess portion 3m is positioned on the outer diameter side relative to the contact portion 121 with respect to the seal land portion 3d of the second contact lip 12d positioned on the outermost diameter side among the contact lips included in the seal member 12. In this case, it is preferable that the inner diameter side edge portion 312 of the recess portion 3m is positioned on the outer diameter side by 1 mm or more relative to the contact portion 121 of the second contact lip 12d. That is, it is preferable that in the radial direction, a separation distance L1 between the inner diameter side edge portion 312 and the contact portion 121 is 1 mm or more.

Thus, since the inner diameter side edge portion 312 of the recess portion 3m is positioned on the outer diameter side relative to the contact portion 121 of the second contact lip 12d, when the hub ring 3 is rotating, for example, in a case where the radial position with respect to the hub ring 3 of the outer side opening portion 2b positioned at the axial one end portion of the outer ring 2 is displaced relatively to the outer diameter side, the contact portion 121 of the second contact lip 12d can be suppressed from falling off into the recess portion 3m to deteriorate the sealing performance.

In particular, by configuring the inner diameter side edge portion 312 of the recess portion 3m to be positioned on the outer diameter side relative to the contact portion 121 of the second contact lip 12d by 1 mm or more, even when the amount of radial positional displacement of the outer side opening portion 2b with respect to the hub ring 3 is large, it is possible to suppress the contact portion 121 from falling off into the recess portion 3m and the sealing performance from deteriorating.

Note that the inner diameter side edge portion 312 of the recess portion 3m is positioned on the outer diameter side relative to the contact portion with respect to the seal land portion 3*d* of the first contact lip 12*c* positioned on the inner diameter side of the second contact lip 12*d*, and even when the radial position with respect to the hub ring 3 of the outer side opening portion 2*b* of the outer ring 2 is relatively displaced to the outer diameter side, it is possible to suppress the contact portion with respect to the seal land portion 3*d* of the first contact lip 12*c* from falling off into the recess portion 3*m* and the sealing performance from deteriorating.

Figure 4:
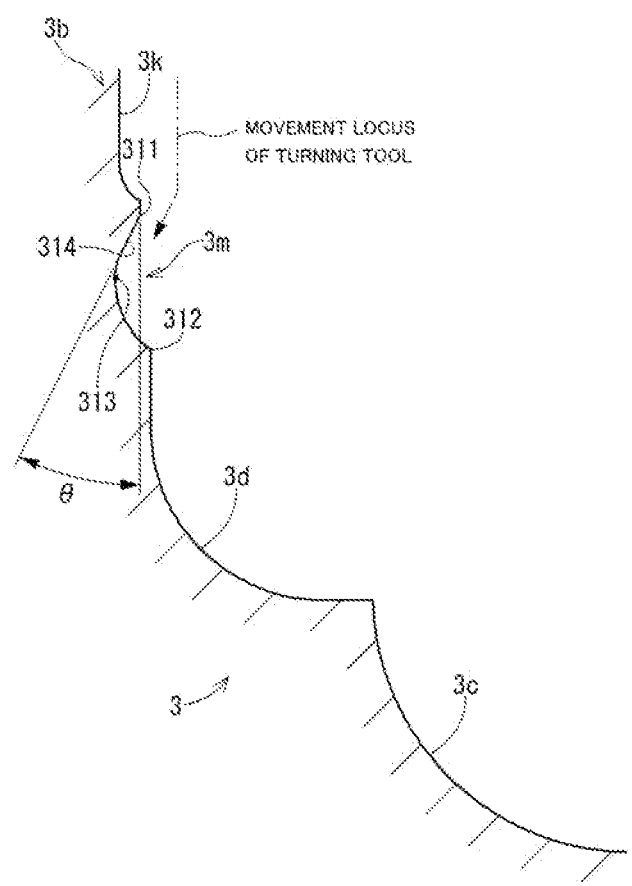
FIG. 4 is a side cross-sectional view illustrating an inclination angle of a tapered face in a recess portion of the vehicle wheel mounting flange.

The recess portion 3*m* includes a tapered face 314 radially extending from the outer diameter side edge portion 311 toward the bottom portion 313 side and inclined to the outer side from the outer diameter side edge portion 311 toward the bottom portion 313. As illustrated in FIG. 4, the tapered face 314 is a tapered face in which an inclination angle θ to the outer side with respect to the radial direction is an acute angle. In the present embodiment, the inclination angle θ is set to be equal to or less than 26.5°.

When turning is performed with the vehicle wheel mounting flange 3*b* from the flange face 3*k* positioned on the outer diameter side of the recess portion 3*m* toward the inner diameter side, the turning tool moves along the movement locus illustrated in FIG. 4. In this case, since the recess portion 3*m* includes the tapered face 314, the turning tool can smoothly enter the recess portion 3*m* along the tapered face 314 from the flange face 3*k*, and the turning tool easily enters the recess portion 3*m*. Thus, after turning of the flange face 3*k* is performed, turning of the recess portion 3*m* can be continuously performed without replacing the turning tool, and the turning work of the hub ring 3 can be simplified.

In particular, since the inclination angle θ to the outer side with respect to the radial direction of the tapered face 314 is a small angle of equal to or less than 26.5°, it is easy for the turning tool to enter the recess portion 3*m* from the flange face 3*k*, and the turning work of the hub ring 3 can be further simplified.

Figure 5:
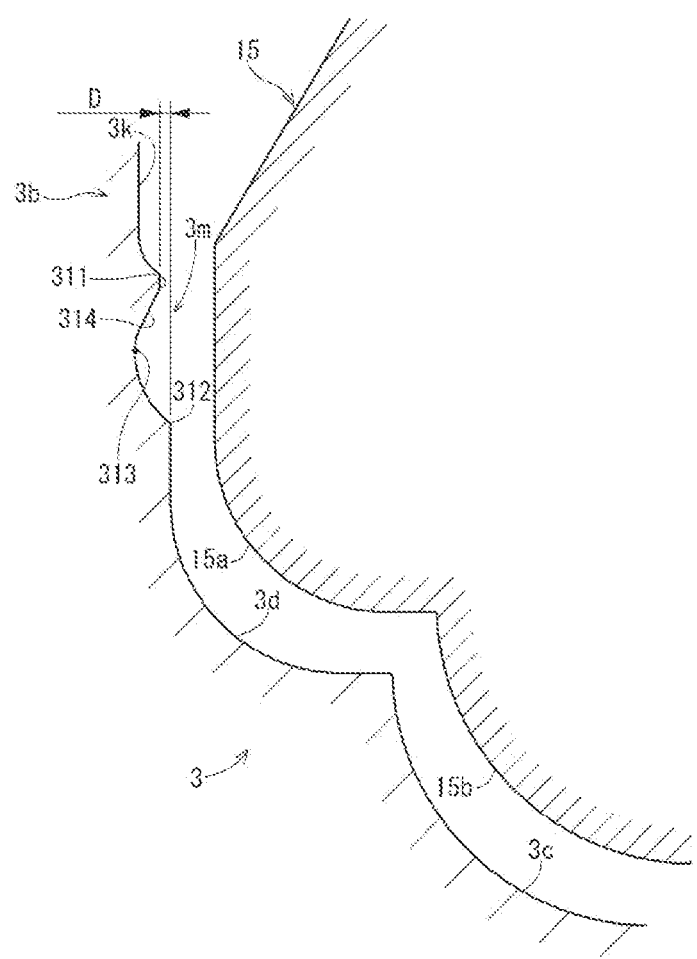
FIG. 5 is a side cross-sectional view illustrating a situation in which an inner diameter side edge portion protrudes on an inner side relative to an outer diameter side edge portion in the recess portion of the vehicle wheel mounting flange.

As illustrated in FIG. 5, the inner diameter side edge portion 312 of the recess portion 3*m* protrudes by a dimension D to the inner side on the outer side seal member 10 side relative to the outer diameter side edge portion 311 in the axial direction.

When grinding is performed on the seal land portion 3*d* and the inner raceway groove 3*c* of the hub ring 3, the grinding is simultaneously performed on the seal land portion 3*d* and the inner raceway groove 3*c* using a grinding wheel 15 having a seal land grinding portion 15*a* and an inner raceway groove grinding portion 15*b*.

In this case, if the outer diameter side edge portion 311 of the recess portion 3*m* protrudes to the inner side relative to the inner diameter side edge portion 312, when grinding of the seal land portion 3*d* and the inner raceway groove grinding portion 15*b* is performed using the grinding wheel 15, the grinding wheel 15 comes into contact with the outer diameter side edge portion 311 of the recess portion 3*m*, and there is a possibility of impairing processability. Since the grinding wheel 15 comes into contact with the outer diameter side edge portion 311 of the recess portion 3*m*, the outer diameter side edge portion 311 is ground by the grinding wheel 15, and thus, there is a possibility that the processing accuracy of the seal land portion 3*d* and the inner raceway groove grinding portion 15*b* is deteriorated or the life of the grinding wheel 15 is shortened.

However, by forming the inner diameter side edge portion 312 of the recess portion 3*m* to protrude to the inner side relative to the outer diameter side edge portion 311, the grinding wheel 15 does not come into contact with the outer diameter side edge portion 311 of the recess portion 3*m* when grinding the seal land portion 3*d* and the inner raceway groove grinding portion 15*b*, and the processability of grinding is not impaired. Since the outer diameter side edge portion 311 of the recess portion 3*m* is not ground by the grinding wheel 15, it is possible to suppress deterioration of the life of the grinding wheel 15 and the processing accuracy of the grinding.

Figure 6:
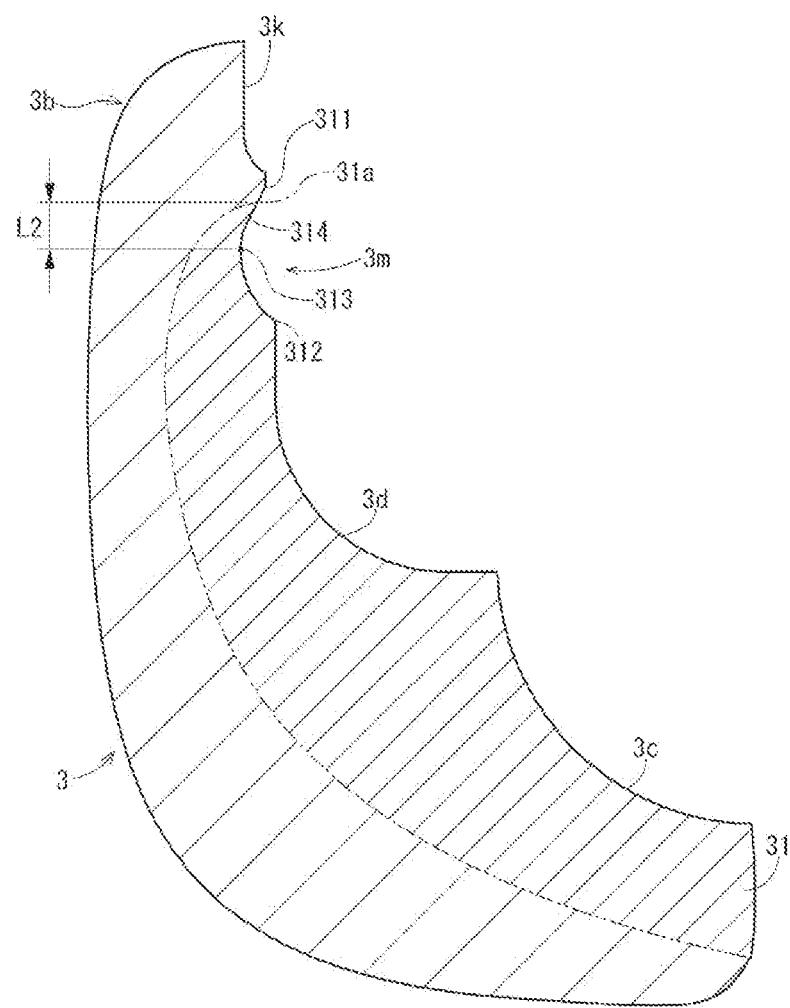
FIG. 6 is a side cross-sectional view illustrating a situation in which an outer peripheral edge on an outer diameter side in a heat treatment portion is positioned on an outer diameter side relative to a bottom portion in the recess portion of the vehicle wheel mounting flange.

As illustrated in FIG. 6, the hub ring 3 includes a heat treatment portion 31 quenched within a range where at least the inner raceway groove 3*c*, the seal land portion 3*d*, and the recess portion 3*m* are formed. In the present embodiment, the part where the inner raceway groove 3*c* and the seal land portion 3*d* are formed is entirely quenched, and the part where the recess portion 3*m* is formed is quenched in a partial range.

However, the part where the recess portion 3*m* is formed can also be entirely quenched. Quenching may be applied to a range beyond the part where the inner raceway groove 3*c*, the seal land portion 3*d*, and the recess portion 3*m* are formed.

In the heat treatment portion 31, the surface hardness and strength of the hub ring 3 are improved. Quenching in the heat treatment portion 31 can be performed by induction quenching, carburization quenching, or the like.

The heat treatment portion 31 includes an outer peripheral edge 31*a* serving as a boundary with a non-heat treatment portion on the outer face of the hub ring 3, and the outer peripheral edge 31*a* on the outer diameter side in the heat treatment portion 31 is positioned on the outer diameter side relative to the bottom portion 313 of the recess portion 3*m*. In this case, the outer peripheral edge 31*a* of the heat treatment portion 31 is preferably positioned on the outer diameter side by 1 mm or more relative to the bottom portion 313 of the recess portion 3*m*. That is, it is preferable that in the radial direction, a separation distance L2 between the bottom portion 313 of the recess portion 3*m* and the outer peripheral edge 31*a* positioned on the outer diameter side relative to the bottom portion 313 is 1 mm or more.

When the hub ring 3 rotates and a centrifugal force acts on the vehicle wheel mounting flange 3*b*, the largest stress is applied to the bottom portion 313 in the recess portion 3*m*. On the other hand, a tensile stress is generated at the outer peripheral edge 31*a* serving as a boundary position between the heat treatment portion 31 and the non-heat treatment portion. Therefore, when the outer peripheral edge 31*a* is positioned at the bottom portion 313 of the recess portion 3*m*, the bottom portion 313 is applied with tensile stress generated at the boundary position between the heat treatment portion 31 and the non-heat treatment portion in addition to large stress due to centrifugal force. Due to this, the stress applied to the bottom portion 313 becomes excessive, and the recess portion 3*m* may be cracked.

Therefore, in the hub ring 3, the outer peripheral edge 31*a* of the heat treatment portion 31 is disposed on the outer diameter side relative to the bottom portion 313 of the recess portion 3*m*, and the outer peripheral edge 31*a* is set not to be positioned at the bottom portion 313. This suppresses application of excessive stress to the bottom portion 313 of the recess portion 3*m* and can prevent a crack from occurring in the hub ring 3 with the bottom portion 313 of the recess portion 3*m* as a starting point.

Although an embodiment of the present invention has been described above, the present invention is not limited to such embodiment in any way, and is merely an example, and it is needless to say that the present invention can be carried out in various forms without departing from the gist of the present invention. The scope of the present invention is indicated by the description of the claims, and further includes the equivalent meaning and all changes within the scope of the claims.

INDUSTRIAL APPLICABILITY

The present invention is applicable to a bearing device for vehicle wheel.

REFERENCE SIGNS LIST

| | |
|---|---|
| 1 | bearing device for vehicle wheel |
| 2 | outer ring |
| 2b | outer side opening portion |
| 2c | outer raceway groove (on inner side) |
| 2d | outer raceway groove (on outer side) |
| 3 | hub ring |
| 3b | vehicle wheel mounting flange |
| 3c | inner raceway groove |
| 3d | seal land portion |
| 3k | flange face |
| 3m | recess portion |
| 4 | inner ring |
| 4a | inner raceway groove |
| 5 | inner side ball row |
| 6 | outer side ball row |
| 10 | outer side seal member |
| 11 | core metal |
| 12 | seal member |
| 12c | first contact lip |
| 12d | second contact lip |
| 12e | labyrinth lip |
| 31 | heat treatment portion |
| 31a | outer peripheral edge |
| 311 | outer diameter side edge |
| 312 | inner diameter side edge |
| 313 | bottom portion |
| 314 | tapered face |
| θ | inclination angle |

The invention claimed is:

1. A bearing device for a vehicle wheel comprising:
an outer member having first and second rows of outer raceway grooves on an inner periphery of the outer member;
an inner member including a hub ring having a hub flange extending radially outward at a first axial end portion and having a small diameter step portion extending axially on an outer periphery, and at least one inner ring press-fitted into the small diameter step portion of the hub ring, the small diameter step portion having a diameter that is smaller than an outer side end portion of the hub ring, the inner member having first and second rows of inner raceway grooves facing the first and second rows of outer raceway grooves, respectively;
first and second rows of rolling elements, the first row of rolling elements being rollably accommodated between the first row of outer raceway grooves of the outer member and the first row of inner raceway grooves of the inner member, the second row of rolling elements being rollably accommodated between the second row of outer raceway grooves of the outer member and the second row of inner raceway grooves of the inner member; and
a sealing device closing an opening end on a first axial end side of an annular space formed by the outer member and the inner member, wherein
the hub ring includes one of the first and second inner raceway grooves, a seal land portion with which the sealing device comes into sliding contact positioned at a base end portion of the hub flange, a recess portion positioned on an outer diameter side of the seal land portion in the hub flange, and a flange face positioned on an outer diameter side of the recess portion in the hub flange,
the sealing device includes a core metal fitted a first axial end portion of the outer member, and a seal member integrally joined to the core metal,
the seal member includes at least one contact lip extending from the core metal toward the hub flange side and coming into contact with the seal land portion, and a labyrinth lip extending from the core metal toward the hub flange side on an outer diameter side relative to the at least one contact lip and axially faces the recess portion across a gap,
the recess portion includes a bottom portion positioned between an outer diameter side edge portion and an inner diameter side edge portion of the recess portion, the bottom portion being a portion where a depth of the recess portion is largest, and a tapered face radially extending from the outer diameter side edge portion toward the bottom portion and inclined toward a first axial end side of the hub ring from the outer diameter side edge portion toward the bottom portion, and
wherein an inclination angle of the tapered face relative to the outer diameter side edge portion is equal to or less than 26.5°.

2. The bearing device for a vehicle wheel according to claim 1, wherein the flange face and the recess portion include a turning face.

3. The bearing device for a vehicle wheel according to claim 1, wherein
the seal land portion and the one of the first and second inner raceway grooves of the hub ring include a ground face, and
the inner diameter side edge portion of the recess portion in the hub flange protrudes farther toward the sealing device relative to the outer diameter side edge portion in an axial direction.

4. The bearing device for a vehicle wheel according to claim 1, wherein
the hub ring includes a heat treatment portion quenched within a range in which at least the one of the first and second inner raceway grooves, the seal land portion, and the recess portion are formed, and
an outer peripheral edge on an outer diameter side in the heat treatment portion is positioned on an outer diameter side relative to the bottom portion of the recess portion.

5. The bearing device for a vehicle wheel according to claim 1, wherein the inner diameter side edge portion of the recess portion of the hub flange is positioned on an outer diameter side relative to a contact portion of the at least one contact lip of the seal member at which the at least one contact lip comes into contact with the seal land portion.

6. The bearing device for a vehicle wheel according to claim 1, wherein the at least one contact lip comprises two or more contact lips.

* * * * *